United States Patent [19]

Kubota

[11] Patent Number: 5,034,980
[45] Date of Patent: Jul. 23, 1991

[54] MICROPROCESSOR FOR PROVIDING COPY PROTECTION

[75] Inventor: Satoshi Kubota, Tsukuba, Japan

[73] Assignee: Intel Corporation, Santa Clara, Calif.

[21] Appl. No.: 541,481

[22] Filed: Jun. 21, 1990

Related U.S. Application Data

[63] Continuation of Ser. No. 246,496, Sep. 19, 1988, abandoned.

[30] Foreign Application Priority Data

Oct. 2, 1987 [JP] Japan .............................. 62-250067

[51] Int. Cl.⁵ .......................... H04L 9/00; H04K 1/00
[52] U.S. Cl. ......................................... 380/4; 364/200;
364/900; 380/25
[58] Field of Search ...................... 380/4, 25; 364/200, 364/900

[56] References Cited

U.S. PATENT DOCUMENTS

| | | |
|---|---|---|
| 4,168,396 | 9/1979 | Best . |
| 4,278,837 | 7/1981 | Best . |
| 4,633,388 | 12/1986 | Chiu . |
| 4,757,468 | 7/1988 | Domenik et al. .................... 364/900 |

Primary Examiner—Stephen C. Buczinski
Attorney, Agent, or Firm—Blakely, Sokoloff, Taylor & Zafman

[57] ABSTRACT

A microprocessor is encrypted with a unique code during its manufacture. When copy protection of software designed to operate with the microprocessor is desired, software is encrypted to function uniquely with that microprocessor. The software is ciphered such that only the unique cryptographic code in the microprocessor can decipher it. If the software or its copy is executed on another processor, the deciphering cannot occur. Two-pairs of CMOS transistors form each bit of the code integrated with the microprocessor.

23 Claims, 2 Drawing Sheets

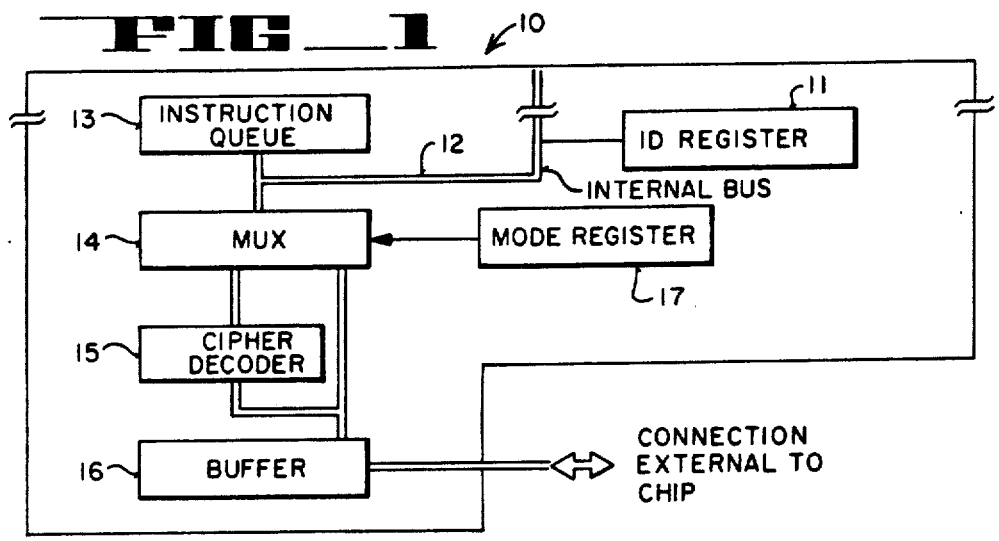
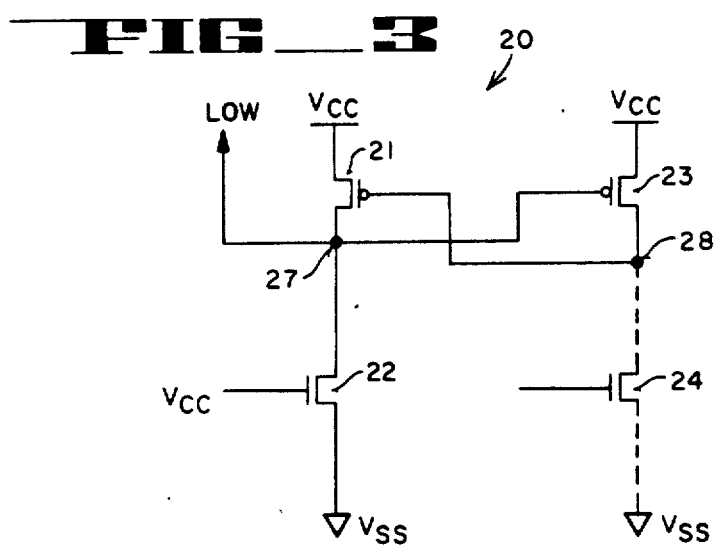
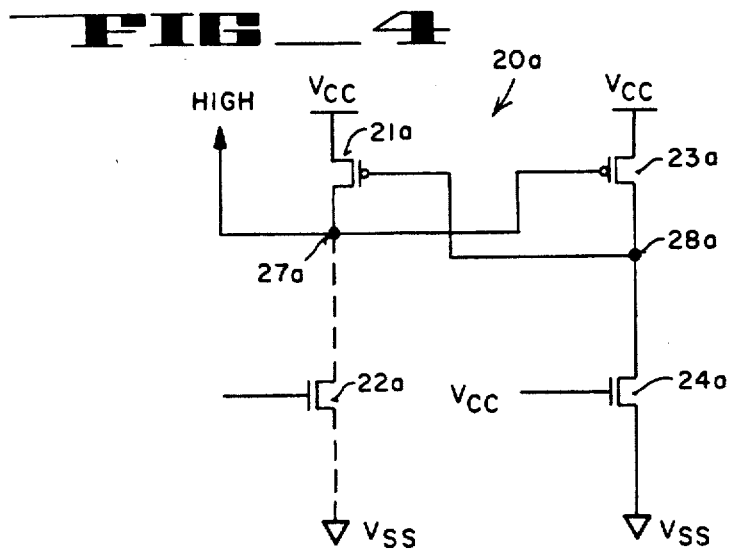

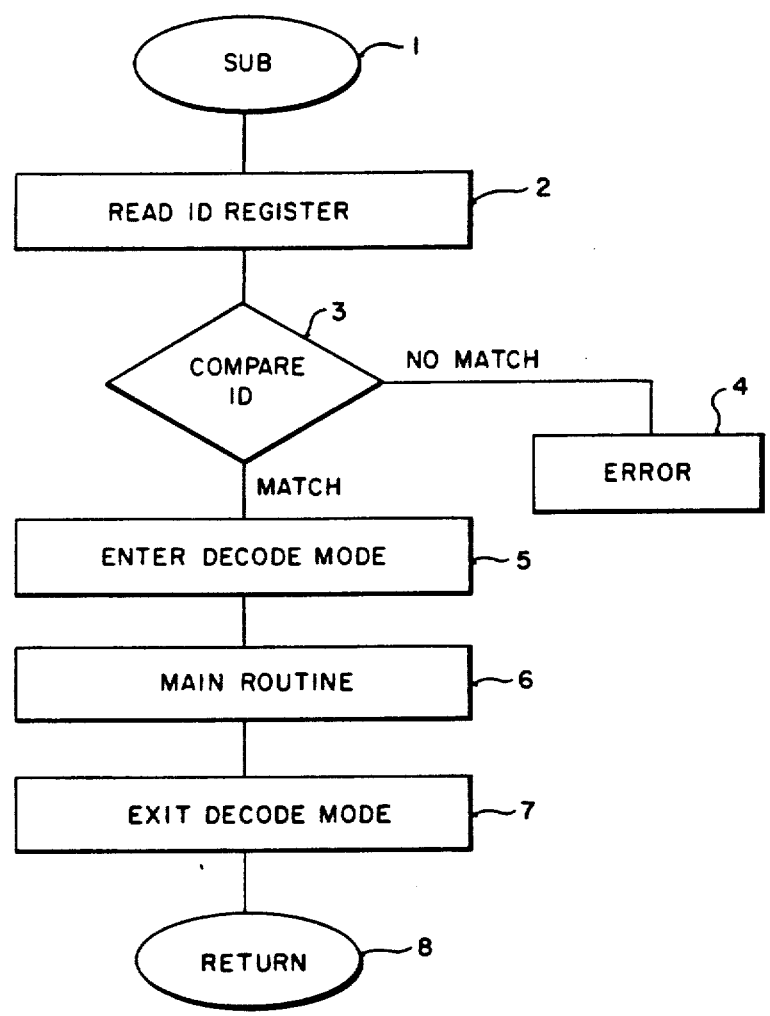

MICROPROCESSOR FOR PROVIDING COPY PROTECTION

This is a continuation of application of Ser. No. 246,496, filed 9/19/88, now abandoned.

BACKGROUND OF THE INVENTION

1. Field of the Invention

The present invention relates to the field of copy protection of computer software and more particularly to embedding a copy protection circuit within a microprocessor chip.

2. Prior Art

In order to prohibit illegal copying of computer software, various prior art techniques are available to provide protection from such illegal copying. Although various techniques are available to protect the copying of computer software, it is difficult to grasp the realities of software utilization in the personal computer environment. Therefore, some of the more sophisticated techniques do not lend themselves to such personal computer environment. Most software vendors will provide some means of copy protection on their products which are sold on floppy disks. Typically, the copy protection is in the software itself. However, in this instance, the user cannot readily make backup copies or copy the program from a floppy disk to a hard disk. In some instances, special copy tools are needed to provide for such legal copying. In addition, it is not possible to effect a perfect copy protection since various copy tools can be used to make copies or disable the intended protection.

One of the more common methods of providing copy protection of computer software is by applying some treatment to the floppy disk to disable copying to any other source. Generally some special code is written onto the outside of the normal track of the floppy disk and this code is not copied properly when ordinary copy commands are utilized. In this instance, a special copy tool is required. However in such instances the copy tools must be very sophisticated in order that such tools cannot readily be exploited by the copy pirate. Such tools cannot prohibit illegal use of software.

In the personal computer environment, most application software are sold to the user on floppy disks. However, to facilitate the usage of such application programs, most users require the program to be copied onto the hard disk of their personal computer system. It is impossible or highly inconvenient to install protected software on the floppy disk to permit only such copying onto a hard disk. Therefore, in most instances a copy tool is required to make such a copy, but again, such tools can be readily used to illegally copy the software. Although it may be possible to derive such highly complex protection mechanisms, the more complex the protection, the more time is required for checking the routine of the software. Further, once the program is copied onto a hard disk, it is almost impossible to prevent copying of the program from the hard disk onto another medium.

It is appreciated then that what is required is a simple computer software copy protection mechanism wherein illegal copying of this software is prohibited, but ordinary copy commands can be utilized to permit legal copying without the use of external copy tools.

SUMMARY OF THE INVENTION

The present invention provides for an apparatus and a method which integrates within it a circuit for interpreting a cryptographic code present in a computer software. A one-to-one relationship is established between a given processor and copy-protected ciphered software which is to be run on that processor. By integrating within each processor a unique cryptographic key code, only the software which also includes a unique corresponding cryptographic code will operate with that given processor. In the event illegal copying occurs, ciphered software is also copied and when this illegally copied software is taken to any other processor, such as to another personal computer, the processor in the second computer will not have the appropriate cryptographic code, preventing the copied software from operating with the second computer.

In order to achieve this unique coding scheme, each microprocessor chip has integrated within it a circuit which contains the cryptographic code for that microprocessor. When a protected software is provided to the user, the user must obtain a special software program which includes a corresponding cryptographic code to the cryptographic code integrated within the microprocessor chip. Instructions within the protected software activate a decoding circuit associated with the microprocessor to decode the software according to the code embedded in the chip. Unless the proper microprocessor chip with the corresponding cryptographic code is used, the resultant output to the processor itself will not be the intended instructions of the software.

In the event unprotected programs are run on the system, the unprotected program does not initiate the activation of the protection circuit. That is, the microprocessor ignores the use of its internal cryptographic code in executing the software routines.

In the preferred embodiment, a decoding circuit is derived by utilizing complementary-metal-oxide semiconductor (CMOS) technology. In this instance two pairs of CMOS transistors are used to provide decoding for each bit of the cryptographic value. Because E-beam technology is used to draw and dope the transistors, it is difficult or impossible to copy the embedded code.

BRIEF DESCRIPTION OF THE INVENTION

FIG. 1 is a block schematic diagram of the present invention showing a protection mechanism integrated within an integrated circuit.

FIG. 2 is a flow chart showing the sequence of steps used in the protected mode of the present invention.

FIG. 3 is a circuit schematic diagram showing an example of using a CMOS implementation for generating a low-cryptographic bit.

FIG. 4 is a circuit schematic diagram showing an example of using a CMOS implementation for generating a high-cryptographic bit.

DETAILED DESCRIPTION OF THE INVENTION

An integrated semiconductor microprocessor chip which has integrated within it a decoding (deciphering) circuit having a unique cryptographic code for providing copy protection of protected computer software is described. In the following description numerous specific details are set forth such as specific circuit implementation, coding schemes, etc., to provide a thorough understanding of the present invention. It will be obvious, however, to one skilled in the art that the present invention may be practiced without these specific details. In other instances, well-known processing steps and structures have not been set forth in detail in order not to obscure the present invention in unnecessary detail.

The present invention is described in a specific embodiment utilizing a microprocessor and a computer software which is to be processed by the microprocessor. However, it is to be appreciated that the present invention can be applied to a variety of equipment which is controlled by a processor. The protection scheme of the present invention can be utilized, not only with computer software, but also with the processing of digital information, such as music or video. Further, although a microprocessor chip which is typically used in a personal computer is described, it is to be understood that other processors can be used in the practice of the present invention without departing from the spirit and scope of the present invention.

The integrated circuit microprocessor chip of the present invention has integrated within it a deciphering code and a decoding circuit to decode the cryptographically protected software. For each individual chip a unique key (or code) is embedded as part of the decoding circuit during the fabrication of the chip. This key operates to decipher the coded software. Computer software which is to be copy protected is cryptographically coded such that only a unique key can decipher the software. That is, the computer software is coded according to the key value of a particular chip and can operate properly only with the chip having that key. Therefore, there is a one-to-one relationship between a copy protected computer software and a given microprocessor.

In operation, when the software is to be obtained by the computer user, the user must identify to the supplier of the software the identification of the user's specific microprocessor. An identification number (ID) is attributed to each microprocessor. Once the software provider is given an ID, the software supplier will then encrypt the software according to the code associated with that ID. Then this software is provided to the user. When the copy protected software is accessed by the appropriate microprocessor having that ID, the key provides the correct deciphering. However, if the key value is incorrect, indicating that the software is not intended for that microprocessor, then the correct deciphering cannot occur.

Referring to FIG. 1, a portion of the microprocessor semiconductor integrated circuit chip comprising a copy protection circuit 10 is shown. An ID register 11 is coupled to an internal bidirectional data bus 12. Data bus 12 is part of an internal microprocessor bus structure and is coupled to the processor itself. Bus 12 is typically a 16 or 32 bit bus, although the actual number of bits is arbitrary. Program instructions reside within instruction queue 13 which is coupled to data bus 12. Queue 13 and register 11 are coupled to multiplexor (MUX) 14. One connection couples MUX 14 to buffer 16 while a second connection couples MUX 14 to buffer 16 through cipher decoder 15. A copy protection mode selection is provided by mode register 17, which is also coupled to MUX 14. The buffer is coupled externally to the chip for transfer of data.

Functionally, when the given microprocessor chip is manufactured, the key associated with the ID of that microprocessor is embedded in the decoder 15. If the software is not copy protected, then MUX 14 will pass digital data of the software to the microprocessor on the internal bus 12 as a valid program. However, if the software is copy protected, then the program will read the value of the ID in register 11 and make a comparison to the ID value stored in the software. If there is a match, then the software continues to execute its routines and activates the mode register 17 to select the routing through decoder 15, such that routines from the software are passed through decoder 15. The key in decoder 15 deciphers the encrypted software and proper instructions are retrieved only when the intended microprocessor having the appropriate key is used.

FIG. 2 shows a flow diagram of a subroutine in the copy protected software which initiates a copy-protection sequence in the microprocessor. The subroutine is initiated in step 1. In step 2, the ID value in the ID register 11 is read and compared to the ID value in the software in step 3. If no match occurs, then an error is sensed in step 4. If a match occurs, it signifies that the copy protected software is matched to its appropriate microprocessor.

When a match occurs, the software causes the microprocessor to enter the decode mode in step 5, at which point, mode register 17 causes MUX 14 to select the routing through decoder 15. The main routine of the software, which is coded, is passed through the decoder 15 for deciphering in step 6. The deciphered routine of the software is processed by the microprocessor. When the main routine is over, the software causes the microprocessor to exit the decode mode in step 7, at which point, mode register 17 causes MUX 14 to select the route directly coupling buffer 16 to MUX 14 and removing decoder 15 from the data transfer path. Then the protection subroutine of the software is completed in step 8. It is to be appreciated that FIG. 2 shows one sequence of steps for entering the protection mode and that other sequences can be readily implemented without departing from the spirit and scope of the invention. Further, the sequence of FIG. 2 can be readily adapted so that the software can enter and exit the protection mode a number of times once the ID comparison results in a proper match.

In the preferred embodiment a simple exclusive OR (XOR) cipher is utilized. The XOR'ing technique of encryption is well-known in the prior art. A given digital data is exclusively OR'ed with a given encryption code to provide an encrypted output. Further, if this encrypted output is again exclusively OR'ed with the same encryption code, the original input is obtained.

The unique deciphering code is embedded in decoder 15 and decoder 15 provides for the XOR'ing of the digital information of the software. The software is encrypted by the supplier of the software by XOR'ing the software with the same key as the key in the decoder 15. If this protected software is copied, the information is still in the encrypted from. Because of the one-to-one relationship, properly coded software can operate with the microprocessor having a unique key and any illegal attempts at copying will result in an unintelligible data. The protected software enters the protected mode in the preferred embodiment by executing an instruction located in the routine of the software as was described in reference to FIG. 2.

The XOR'ing technique is one of the simplest forms of coding which can be implemented with the present invention. However, th XOR'ing technique is provided as an example for illustrative purpose only. It is appreciated that other coding techniques can be readily adapted to provide the copy protection. Further, one code can be used to encrypt and a different code to decipher the encrypted software.

It may appear that the copy protection technique of the present invention appears to be simple and that a protected program or its copy can be made to function with another microprocessor which has a different key. However, to achieve this illegal use of software, the user must do three things to the protected software. Firstly, the user must find the check routine for comparing the ID in the software and change this value to the ID of his microprocessor. Secondly, the key must be determined so that the software can be deciphered. Thirdly, in the instance the software is partially ciphered, finding the appropriate ciphered routines in the software and applying the key to only those routines which are ciphered.

The first item is typically the easiest to find. The check routine for comparing the ID values can be located in the software and this can be modified. However the last two requirements are difficult to achieve, especially for the ordinary user. Neglecting the fact that the cipher code of the software is not obtained from either the software supplier or the microprocessor manufacturer, there may be two known ways of discovering the code key in the chip, optically and electrically.

However if the key is programmed by diffusion, it is difficult to recognize the code because it is difficult to detect the diffusion. Further, if the chip is molded in plastic it is difficult to detect the diffusion. Further, if the chip is molded in plastic it is difficult to observe the code optically. The electrical method requires testing the chip by using a logic analyzer and observing the behavior of the chip when in the protected mode. This is easier than the optical method and can be accomplished without chip destruction. However, very sophisticated reengineering is required and most ordinary users do not have the knowledge, ability or the equipment.

Finally, the third requirement of finding the ciphered routine in the software is probably the most difficult. That is, the software provider can typically make dummy entries in the product such that users will have difficulty in distinguishing the actual ciphered routine.

In the practice of the present invention, various techniques are available to provide the embedded key in the chip. Use of memory devices such as ROMs, PROMs, and EPROMs, as well as layers of photo masks, are available to provide the microcode. However, memory devices such as PROMs and EPROMs can be readily modified with little effort by the illegal copier and changing of masks for each unique code is prohibitively costly. With the advent of the use of beam technology in semiconductor fabrication, this technique is adapted for providing the embedded key in the chip. The preferred embodiment uses beam technology, electron beam for direct pattern drawing and ionized beam for making the diffusion area, to embed the key in the chip. These techniques are well-known in the prior art.

Referring to FIG. 3, a cipher code programming technique which is achieved by beam technology is shown. The preferred embodiment utilizes two pairs of CMOS transistors to provide circuit 20 for each bit of key code programming. A total of four transistor devices are used for the generation of each key code programming bit. Two p-type transistors 21 and 23 are cross-coupled together having their sources coupled to VCC. The drain of transistor 21 is coupled to node 27 and the drain of transistor 23 is coupled to node 28. The gate of transistor 21 is coupled to node 28 and the gate of transistor 23 is coupled to node 27. Two n-type transistors 22 and 24 are also formed having their sources coupled to VSS, which in this instance is ground. An output for providing the programming bit is taken at node 27.

In this instance where a low state is required from the output at node 27, the drain of transistor 22 is coupled to node 27 and the gate of transistor 22 is coupled to VCC. Transistor 24 is left out of the circuit. The dotted line shown at the drain of transistor 24 illustrates that it is present but not coupled to node 28. Alternatively, transistor 24 need not be present at all.

When the coupling of transistors 22 and 24 appear as shown in FIG. 3, transistor 22 conducts placing node 27 to VSS. VSS potential at node 27 places a low state at the output of circuit 20, at the same time turning on transistor 23. The conduction of transistor 23 places a high potential onto the gate of transistor 21 turning off that device. Therefore, output node 27 is at a low state and node 28 is at a high state.

Referring to FIG. 4, circuit 20a is utilized to generate a high state for a key code programming bit. An equivalent four transistor CMOS configuration as that of FIG. 3 is utilized for circuit 20a to generate a high bit. A letter "a" has been added to the reference numerals of FIG. 3 to designate equivalent parts. Transistors 21a, and 23a are coupled as the circuit 20 in FIG. 3, with the output taken at node 27a. In this instance where a high state is desired from circuit 20a, the drain of transistor 24a is coupled to node 28 and the gate of transistor 24a is coupled to VCC. In this instance transistor 24a conducts, placing a low potential at node 28a. Transistor 21a conducts placing VCC onto node 27a. This high state is also coupled to the gate of transistor 23a turning it off. Transistor 22a is left out of the circuit 20a.

A number of cells, each as shown in FIGS. 3 and 4, are implemented to provide the key embedded in the chip. The four transistor cell 20 of FIG. 3 is utilized to generate a low bit and the four transistor cell 20a of FIG. 4 is utilized to generate a high bit. E-Beam technology is used to activate the appropriate n-type device by doping the appropriate n-type transistor. By using a dummy transistor in the circuit, wherein only one of the n-type transistors is coupled to operate in the circuit 20 or 20a, the copier cannot readily determine the doping by visual observance. It is to be appreciated that although a particular cell is shown utilizing CMOS technology to store each bit of the key, various other circuits can be implemented to practice the present invention.

In the practice of the present invention it is appreciated that in a 16-bit system that only 65,536 unique cipher codes are available and that if additional microprocessor units are produced, then two microprocessors will have the same key code. However, such duplication is negligible considering the quantity and only by chance can one user find a second user with the same key. The present invention need not be limited to a 16-bit system and that a system having more bits will allow more unique codes.

In some instances duplication of the cipher code in a number of systems is desirable. For example, if a site license is granted, such as a case when all computers in a given school is to have access to one protected software, the same cipher code can be implemented in all of the computers in the school. That is, the one copy protected software will run on all the computers in the classroom.

Further, in the practice of the present invention, because the software is copy protected, the software can be transmitted over telecommunication lines and down loaded at the computer. In this instance, if other users intercept the transmission of the software, they cannot use the program. Various other applications and advantages can be derived from the practice of the present invention and these examples are provided for understanding the invention and not for the purpose of limiting the invention. As stated earlier, various forms of digital data can be copy protected by the practice of the present invention.

Thus, a microprocessor for providing copy protection is described.

I claim:

1. A processor for providing copy protection of ciphered digital data which is to be operated on by said processor, said digital data to be deciphered by a predetermined cryptographic code embedded in said processor, wherein there is integrated a copy protection circuit comprising:
  a cryptographic code circuit having a plurality of interconnected transistors defining individual bits of said predetermined cryptographic code, at least one transistor of said plurality of interconnected transistors having been coupled to the others of said plurality of interconnected transistors by an electron beam which selectively activated a diffusion region of said at least one transistor;
  decoder means coupled to said cryptographic code circuit and also coupled to accept said ciphered digital data, wherein when said ciphered digital data is deciphered by using said predetermined cryptographic code, deciphered digital data is recovered only when said ciphered digital data is intended to be operated by said processor having said predetermined cryptographic code, such that a copy of said ciphered digital data requires said processor with said predetermined cryptographic code.

2. The processor of claim 1, wherein said cryptographic code circuit includes a plurality of cells, one for each bit of said predetermined cryptographic code, each said cell comprised of two pairs of complementary metal-oxide semiconductor (CMOS) transistors, wherein state of each bit is determined by coupling of its corresponding pairs of CMOS transistors.

3. The processor of claim 1, wherein said decoder means exclusively OR's said predetermined cryptographic code to provide said deciphering.

4. The processor of claim 1, wherein said decoder means is activated when ciphered digital data is to be processed and is deactivated when unciphered digital data is to be processed.

5. The processor of claim 1, wherein said diffusion regions is formed using beam technology.

6. The processor of claim 5, wherein said cryptographic code is permanently fixed in said cryptographic code circuit.

7. In a semiconductor integrated circuit that includes a microprocessor and means coupled to said microprocessor to access digital data which is to be processed by said microprocessor, said microprocessor being encoded such that software which is to be copy protected is ciphered to operate with only said microprocessor, an improvement comprising:
  a decoder coupled to accept said digital data and wherein when said digital data is ciphered software intended to operate with said microprocessor, deciphering of said digital data being facilitated by a predetermined cryptographic code, in which individual bits of said code are defined by at least one transistor selectively coupled to said decoder by an electron beam having drawn and doped one or more diffusion regions in said semiconductor circuit, but if said ciphered software is intended for another device having a different cryptographic code, then said decoder is incapable of deciphering said ciphered software.

8. The improvement of claim 7, wherein said ciphered software is ciphered using the same cryptographic code as said microprocessor whic said ciphered software is intended.

9. The improvement of claim 8, wherein said cryptographic code is formed in said selected diffusion regions of said integrated circuit by activating said diffusion regions utilizing an electron or ionized beam.

10. The improvement of claim 9, wherein said software is ciphered by exclusively OR'ing said cryptographic code to provide said ciphered software and exclusively OR'ed by said decoder using said cryptographic code to decipher said ciphered software.

11. The improvement of claim 9, wherein said predetermined cryptographic code is permanently fixed in said integrated circuit.

12. In a microprocessor for providing copy protection of ciphered digital data which is to be operated on by said microprocessor wherein said ciphered digital data can only be deciphered by a predetermined cryptographic code, a copy protection circuit comprising:
  a cryptographic code circuit having a plurality of interconnected transistors defining individual bits of said predetermined cryptographic code wherein at least one transistor of said plurality of interconnected transistors has been coupled to the others of said plurality of interconnected transistors by an electron beam which selectively patterned and activated at least one diffusion region of said at least one transistor;
  decoder means coupled to said cryptographic code circuit and also coupled to accept said ciphered digital data, wherein when said ciphered digital data is deciphered by using said cryptographic code, deciphered digital data is recovered only when said ciphered digital data is intended to be operated by said microprocessor having said cryptographic code, such that a copy of said ciphered digital data requires said microprocessor with said cryptographic code;
  selection means coupled to said decoder and also coupled to accept input of digital data for activating said decoder when said ciphered digital data is encountered but deactivating said decoder when unciphered digital data is encountered;
  a bus coupled to said selection means and for providing digital data to said microprocessor.

13. The copy protection circuit of claim 12, wherein said digital data is a computer program.

14. The copy protection circuit of claim 13, wherein said decoder exclusively OR's said cryptographic code with said ciphered digital data.

15. The copy protection circuit of claim 12, wherein said certain diffusion regions are formed using an electron or ion beam.

16. The copy protection circuit of claim 15, wherein said cryptographic code is permanently fixed in said cryptographic code circuit.

17. In a computer system having an integrated circuit processor, a method of providing copy protection to software which is intended to operate only with said computer system comprising the steps of:
   embodying a unique cryptographic code in a cryptographic code circuit having a plurality of interconnected transistors and at least one transistor which is uncoupled from said plurality of interconnected transistors within said processor by selectively patterning and activating at least one diffusion region utilizing an electron beam to couple said at least one transistor to said plurality of interconnected transistors thereby defining individual bits of said code;
   ciphering said software such that only said unique cryptographic code of said processor can decipher said software and use of said software by other processors results in unintelligible use;
   wherein copies of said ciphered software still requires said unique cryptographic code.

18. The method of claim 17, wherein said step of embodying a unique cryptographic code is accomplished using an electron or ion beam.

19. The method of claim 18, wherein said step of embodying a unique cryptographic code results in a permanently fixed cryptographic code.

20. A processor for providing copy protection of ciphered digital data which is to be operated on by said processor, said digital data to be deciphered by a predetermined cryptographic code embedded in said processor, wherein there is integrated a copy protection circuit comprising:
   a cryptographic code circuit having a plurality of interconnected transistors, and at least one transistor which is uncoupled from said plurality of interconnected transistors, wherein individual bits of said predetermined cryptographic code are created by the process of selectively activating a diffusion region utilizing an electron beam thereby coupling said at least one transistor to said plurality of interconnected transistors;
   decoder means coupled to said cryptographic code circuit and also coupled to accept said ciphered digital data, wherein when said ciphered digital data is deciphered by using said predetermined cryptographic code, deciphered digital data is recovered only when said ciphered digital data is intended to be operated by said processor having said predetermined cryptographic code, such that a copy of said ciphered digital data requires said processor with said predetermined cryptographic code.

21. The processor of claim 20, wherein said cryptographic code circuit includes a plurality of cells, one for each bit of said predetermined cryptographic code, each said cell comprised of two pairs of complementary metal-oxide semiconductors (CMOS) transistors, wherein state of each bit is determined by coupling of its corresponding pairs of CMOS transistors.

22. The processor of claim 20, wherein said decoder means exclusively OR's said predetermined cryptographic code to provide said deciphering.

23. The processor of claim 20, wherein said decoder means is activated when ciphered digital data is to be processed and is deactivated when ciphered digital data is to be processed.

* * * * *

UNITED STATES PATENT AND TRADEMARK OFFICE
CERTIFICATE OF CORRECTION

PATENT NO. : 5,034,980
DATED      : July 23, 1991
INVENTOR(S) : Satoshi Kubota

It is certified that error appears in the above-indentified patent and that said Letters Patent is hereby corrected as shown below:

Col. 4, Line 59   Delete "from" Insert --form--

Col. 5, Line 32   Delete "Further, if the chip is molded in plastic it is difficult to detect the diffusion."

Signed and Sealed this

Twenty-sixth Day of July, 1994

Attest:

BRUCE LEHMAN

*Attesting Officer*        *Commissioner of Patents and Trademarks*

UNITED STATES PATENT AND TRADEMARK OFFICE
CERTIFICATE OF CORRECTION

PATENT NO. : 5,034,980
DATED : July 23, 1991
INVENTOR(S) : Satoshi Kubota

It is certified that error appears in the above-indentified patent and that said Letters Patent is hereby corrected as shown below:

| COLUMN | LINE | |
|--------|------|---|
| 6 | 35 | delete "28" insert --28a-- |

Signed and Sealed this

Fifteenth Day of November, 1994

Attest:

BRUCE LEHMAN

Attesting Officer      Commissioner of Patents and Trademarks